US012526858B2

(12) United States Patent
Fu et al.

(10) Patent No.: US 12,526,858 B2
(45) Date of Patent: Jan. 13, 2026

(54) METHOD, DEVICE AND NON-TRANSISTORY MACHINE-READABLE MEDIUM FOR NON-INTERNET PROTOCOL TRAFFIC COMMUNICATION BY USER-EQUIPMENT-TO USER-EQUIPMENT RELAY

(71) Applicant: Telefonaktiebolaget LM Ericsson (PUBL), Stockholm (SE)

(72) Inventors: Zhang Fu, Stockholm (SE); Zhang Zhang, Beijing (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 337 days.

(21) Appl. No.: 18/041,052

(22) PCT Filed: Aug. 12, 2021

(86) PCT No.: PCT/IB2021/057452
§ 371 (c)(1),
(2) Date: Feb. 8, 2023

(87) PCT Pub. No.: WO2022/034540
PCT Pub. Date: Feb. 17, 2022

(65) Prior Publication Data
US 2023/0269802 A1    Aug. 24, 2023

(30) Foreign Application Priority Data
Aug. 12, 2020    (WO) ................ PCT/CN2020/108573

(51) Int. Cl.
*H04W 88/04*    (2009.01)
*H04W 76/14*    (2018.01)
(52) U.S. Cl.
CPC ............ *H04W 76/14* (2018.02); *H04W 88/04* (2013.01)

(58) Field of Classification Search
CPC ....... H04W 76/14; H04W 88/04; H04W 4/70; H04W 76/11; H04W 76/18; H04W 72/04;
(Continued)

(56) References Cited

U.S. PATENT DOCUMENTS

2016/0270134 A1*  9/2016  Stojanovski .......... H04W 40/00
2020/0014672 A1*  1/2020  Stojanovski .......... H04W 76/14
(Continued)

FOREIGN PATENT DOCUMENTS

EP        3 618 391 A1     3/2020
WO    WO2019246446 A1    12/2019

OTHER PUBLICATIONS

3GPP TR 23.752 V0.3.0; 3rd Generation Partnership Project; Technical Specification Group Services and System Aspects; Study on system enhancement for Proximity based Services (ProSe) in the 5G System (5GS) (Release 17)—Jan. 2020.
(Continued)

*Primary Examiner* — Cindy Trandai
(74) *Attorney, Agent, or Firm* — Baker Botts L.L.P.

(57) ABSTRACT

A method for Non-IP traffic communication by UE-to-UE relay is provided. The method is implemented by a network device in a communication network. The method includes receiving a first Direct Communication Request from a source UE. The first Direct Communication Request indicates the establishment of a Non-IP communication link with the source UE and includes a first source UE identifier for the source UE and a first target UE identifier for a target UE. The network device generates a first relay identifier for a relay used in the Non-IP communication link between a source UE and the target UE. The network device maintains a mapping between the first relay identifier, the first source UE identifier, and the first target UE identifier.

17 Claims, 6 Drawing Sheets

(58) Field of Classification Search
CPC ..... H04W 76/27; H04W 72/12; H04W 76/20; H04W 72/20; H04W 76/19; H04W 92/18; H04L 61/106
See application file for complete search history.

(56) References Cited

U.S. PATENT DOCUMENTS

| | | | | |
|---|---|---|---|---|
| 2020/0053802 | A1* | 2/2020 | Li | H04W 12/06 |
| 2020/0221298 | A1* | 7/2020 | Pan | H04W 12/50 |
| 2020/0329513 | A1* | 10/2020 | Pan | H04W 76/11 |
| 2020/0413467 | A1* | 12/2020 | Pan | H04W 72/04 |
| 2022/0286820 | A1* | 9/2022 | Yoshizawa | H04L 63/162 |
| 2023/0072379 | A1* | 3/2023 | Cheng | H04W 76/14 |

OTHER PUBLICATIONS

3GPP TS 23.287 V17.4.0; 3rd Generation Partnership Project; Technical Specification Group Services and System Aspects; Architecture enhancements for 5G System (5GS) to support Vehicle-to-Everything (V2X) services (Release 17)—Sep. 2022.

3GPP TSG-WG SA2 Meeting #139E e-meeting; Elbonia; Source: Huawei, HiSilicon, MediaTek Inc.; Title: KI#4, Sol#9: Update for Connection establishment via UE-to-UE Layer-2 Relay (S2-2004022)—Jun. 1-12, 2020.

SA WG2 Meeting #139e; Elbonia; Source: Interdigital; Title: KI#4, Sol#9 Update: Support of Privacy when using UE-to-UE Relay (S2-2004741)—Jun. 1-12, 2020.

SA WG2 Meeting #141E (e-meeting); Elbonia; Source: ZTE; Title: KI#4, Sol#49: Update to Clarify the Mapping Information for Relay (S2-2007443)—Oct. 12-23, 2020.

PCT International Search Report issued for International application No. PCT/IB2021/057452—Oct. 15, 2021.

PCT Written Opinion of the International Searching Authority issued for International application No. PCT/IB2021/057452—Oct. 15, 2021.

3GPP TSG-RAN WG3 Meeting #107-e; Online, Feb. 24-Mar. 6, 2020; Agenda Item: 13.3.2.2; Source: Ericsson, KDDI; Title: (TP for NR-IAB BL CR for TS 38.401): The Remaining Issues (R3-200819).

Examination Report issued by Intellectual Property India for Application No. 202317009496—Apr. 2, 2024.

3GPP TR 23.752 V17.0.0 (Mar. 2021); 3rd Generation Partnership Project; Technical Specification Group Services and System Aspects; Study on system enhancement for Proximity based Services (ProSe) in the 5G System (5GS) (Release 17).

3GPP TR 23.752 V0.4.0 (Jun. 2020); 3rd Generation Partnership Project; Technical Specification Group Services and System Aspects; Study on system enhancement for Proximity based Services (ProSe) in the 5G System (5GS) (Release 17).

3GPP TS 23.287 V17.4.0 (Sep. 2022); 3rd Generation Partnership Project; Technical Specification Group Services and System Aspects; Architecture enhancements for 5G System (5GS) to support Vehicle-to-Everything (V2X) services (Release 17).

3GPP TR 23.752 V0.3.0 (Jan. 2020); 3rd Generation Partnership Project; Technical Specification Group Services and System Aspects; Study on system enhancement for Proximity based Services (ProSe) in the 5G System (5GS) (Release 17).

* cited by examiner

METHOD, DEVICE AND NON-TRANSISTORY MACHINE-READABLE MEDIUM FOR NON-INTERNET PROTOCOL TRAFFIC COMMUNICATION BY USER-EQUIPMENT-TO USER-EQUIPMENT RELAY

PRIORITY

This nonprovisional application is a U.S. National Stage Filing under 35 U.S.C. § 371 of International Patent Application Serial No. PCT/IB2021/057452 filed Aug. 12, 2021 and entitled "METHOD, DEVICE AND NON-TRANSITORY MACHINE-READABLE MEDIUM FOR NON-INTERNET PROTOCOL TRAFFIC COMMUNICATION BY USER-EQUIPMENT-TO USER-EQUIPMENT RELAY" which claims priority International Patent Application Serial No. PCT/CN2020/108573 filed Aug. 12, 2020, both of which are hereby incorporated by reference in their entirety.

TECHNICAL FIELD

The present disclosure generally relates to communication networks, and more specifically to methods and devices for Non-Internet Protocol traffic communication by User Equipment-to-User Equipment (UE-to-UE) relay.

BACKGROUND

A sidelink (SL) interface allows a User Equipment (UE) to directly communicate with a peer UE without sending the packet to the network (NW). A UE-to-NW relay solution is also defined such that a remote UE that is outside of cell coverage can still reach the NW via a relay UE. The remote UE communicates with the relay UE using the SL interface, and the relay UE has uplink and downlink connections with the cell.

A number of enhancements to these solutions have been introduced with an objective of enlarging the use cases that could benefit from the Device-to-Device (D2D) technology. In particular, in LTE Release-14 (Rel-14) and Release-15 (Rel-15), the extensions for the device-to-device work consist of support of Vehicle-to-Everything (V2X) communications, including any combination of direct communications between vehicles, pedestrians, and the infrastructure.

While LTE V2X mainly aims at traffic safety services, NR V2X has a much broader scope that includes basic safety services and also targets non-safety applications, such as sensor/data sharing between vehicles. The objective is to strengthen the perception of the surrounding environment. Thus, a new set of applications, such as vehicles platooning, cooperative maneuver between vehicles, and remote/autonomous driving may use this enhanced sidelink framework.

For NR SL, unicast at access stratum is supported for services requiring high reliability. Between the same UE pair, there can be multiple SL unicast links, and each link can support multiple SL Quality of Service (QoS) flows/radio bearers, as illustrated in FIG. 1, which is taken from 3GPP TS 23.287. At access stratum, each link can be identified by the source and destination Layer 2 identifier (L2 ID). For instance, the PC5 unicast link 1 in FIG. 1 can be identified by the pair of L2 ID1 (i.e. corresponding to application ID1) and L2 ID2 (i.e. corresponding to application ID2).

Certain problems exist. For example, 3GPP TR 23.752 intends to support for UE-to-UE Relay to enable a source UE and a target UE to communicate via a UE-to-UE relay when they are out of communication range. Though the data traffic between the source and target UE could be IP based or Non-IP based, all the solutions for Layer-3 UE-to-UE relay disclosed in 3GPP TR 23.752 focus only on handling Internet Protocol (IP) traffic. How to handle Non-IP traffic by Layer-3 UE-to-UE relay (without IP encapsulation) has not been addressed.

SUMMARY

To address the foregoing problems with existing solutions, disclosed are systems and methods for handling Non-IP traffic by Layer-3 UE-to-UE relay without IP encapsulation.

According to certain embodiments, a method implemented by a network device operating as a relay in a communication network includes receiving a first Direct Communication Request from a source UE. The first Direct Communication request indicates the establishment of a Non-IP communication link with the source UE. The first Direct Communication Request includes a first source UE identifier for the source UE and a first target UE identifier for a target UE. The network device generating a first relay identifier for the relay used in the Non-IP communication link between the source UE and the target UE and maintains a mapping between the first relay identifier, the first source UE identifier, and the first target UE identifier.

According to certain embodiments, a network device in a communication network includes a processor and a memory communicatively coupled to the processor and adapted to store instructions. When executed by the processor, the instructions cause the network device to receive a first Direct Communication Request from a source UE the first Direct Communication request indicating the establishment of a Non-IP communication link with the source UE. The first Direct Communication Request includes a first source UE identifier for the source UE and a first target UE identifier for a target UE. When executed by the processor, the instructions cause the network device to generate a first relay identifier for the relay used in the Non-IP communication link between the source UE and the target UE and maintain a mapping between the first relay identifier, the first source UE identifier, and the first target UE identifier.

According to certain embodiments, a non-transitory machine-readable medium has a computer program stored thereon, which when executed by a set of one or more processors of a network device, causes the network device to receive a first Direct Communication Request from a source UE. The first Direct Communication request indicates the establishment of a Non-IP communication link with the source UE. The first Direct Communication Request includes a first source UE identifier for the source UE and a first target UE identifier for a target UE. When executed, the computer program causes the network device to generate a first relay identifier for the relay used in the Non-IP communication link between the source UE and the target UE and maintain a mapping between the first relay identifier, the first source UE identifier, and the first target UE identifier.

Certain embodiments of the present disclosure may provide one or more technical advantages. For example, certain embodiments may enable Layer-3 UE-to-UE relay to handle Non-IP traffic without IP encapsulation. Other advantages may be readily apparent to one having skill in the art. Certain embodiments may have none, some, or all of the recited advantages.

BRIEF DESCRIPTION OF THE DRAWINGS

The present disclosure may be best understood by way of example with reference to the following description and accompanying drawings that are used to illustrate embodiments of the present disclosure. In the drawings.

DETAILED DESCRIPTION

Figure 1:
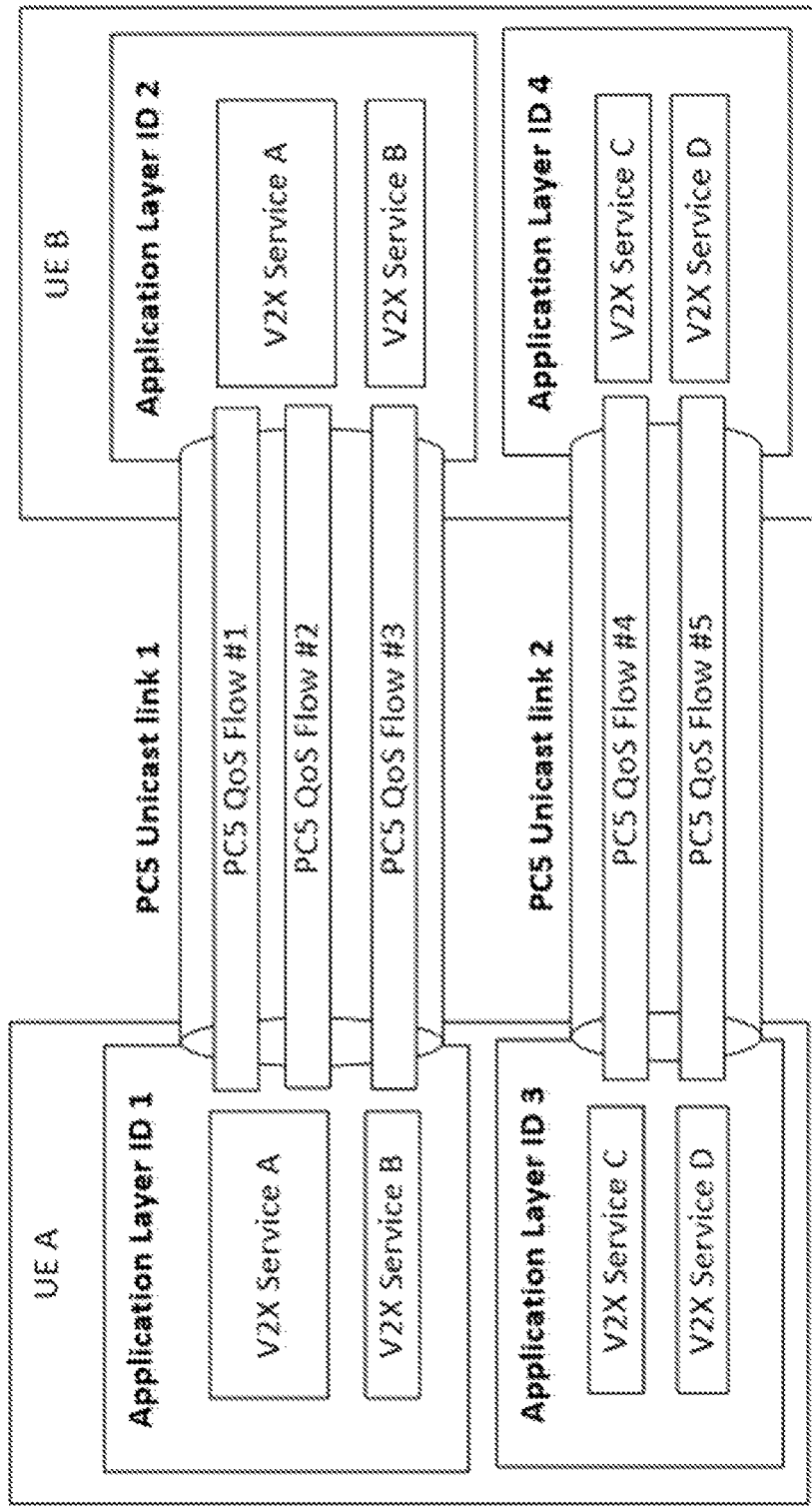
FIG. 1 illustrates NR SL unicast links between two UE.

The following detailed description describes methods and apparatuses for Non-IP traffic communication by a UE-to-UE relay. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

As used herein, the terms "first", "second" and so forth refer to different elements. The singular forms "a", "an", and "the" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "according to" is to be read as "at least in part according to". The term "one embodiment" and "an embodiment" are to be read as "at least one embodiment". The term "another embodiment" is to be read as "at least one other embodiment".

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of or one or more physical network interfaces to establish network connections (to transmit and/or receive code and/or data using propagating signals) with other electronic devices. One or more parts of an embodiment of the present disclosure may be implemented using different combinations of software, firmware, and/or hardware.

According to certain embodiments, there is provided a method implemented by a network device in a communication network. The method may include receiving a first Direct Communication Request from a source UE indicating the establishment of a Non-IP communication link with the source UE. The first Direct Communication Request includes a first source UE identifier for the source UE and a first target UE identifier for a target UE. The method may further includes generating a first relay identifier for a relay used in the Non-IP communication link between a source UE and the target UE. The network device maintains a mapping between the first relay identifier and the first source UE identifier and the first target UE identifier.

According to certain other embodiments, a network device includes a processor and a memory communicatively coupled to the processor. The memory is adapted to store instructions which, when executed by the processor, cause the network device to perform steps of the method described above.

According to certain other embodiments, a non-transitory machine-readable medium incudes a computer program stored thereon. The computer program, when executed by a set of one or more processors of a network device, causes the network device to perform steps of the method described above.

Figure 2:
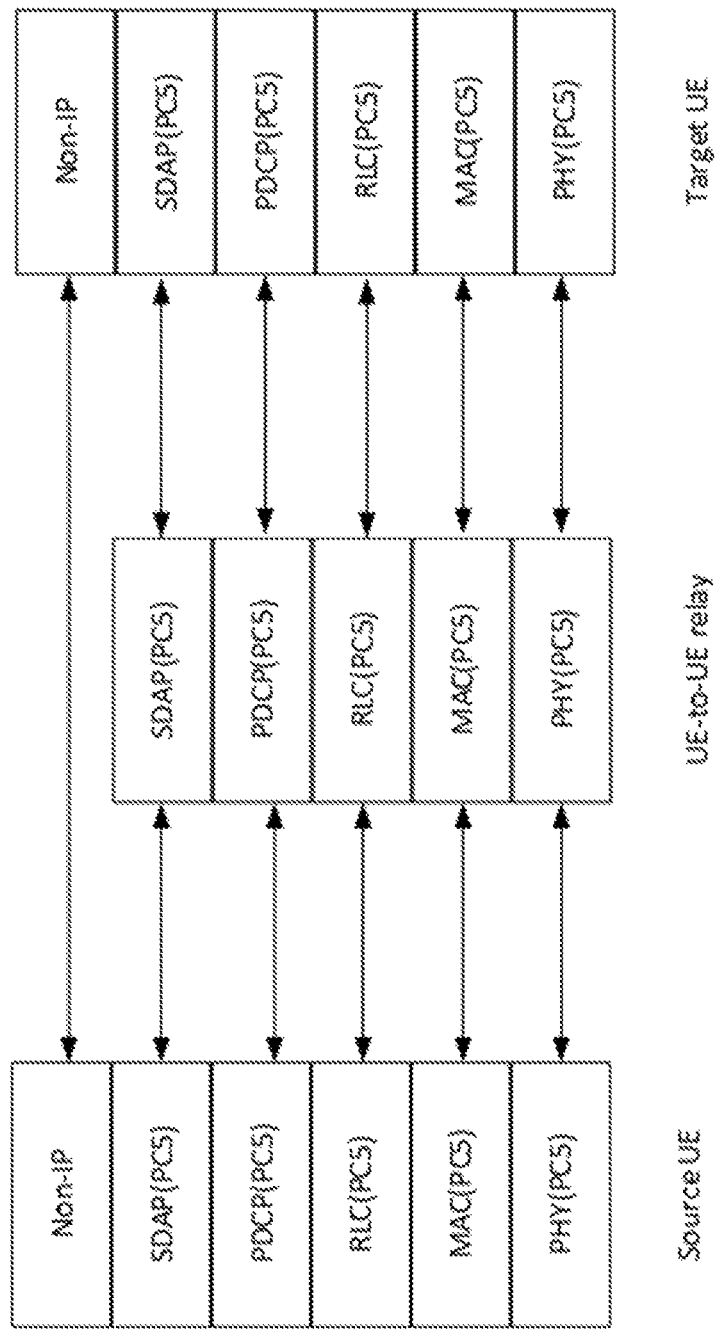
FIG. 2 illustrates a User plane protocol stack of PC5 when using Layer-3 UE-to-UE relay to forward Non-IP traffic.

FIG. 2 illustrates a User plane protocol stack of PC5 when using Layer-3 UE-to-UE relay to forward Non-IP traffic.

The main services and functions of Service Data Adaptation Protocol (SDAP) include:

Mapping between a Quality of Service (QoS) flow and a data radio bearer; and

Marking QoS flow ID (QFI) in both downlink (DL) and uplink (UL) packets.

The main services and functions of the Packet Data Convergence Protocol (PDCP) sublayer include:
- Transfer of data (user plane or control plane);
- Maintenance of PDCP Series Numbers (SNs);
- Header compression and decompression using the Robust Header Compression (ROHC) protocol;
- Header compression and decompression using Ethernet Header Compression (EHC) protocol;
- Ciphering and deciphering;
- Integrity protection and integrity verification;
- Timer based SDU discard;
- For split bearers, routing;
- Duplication;
- Reordering and in-order delivery;
- Out-of-order delivery; and
- Duplicate discarding.

The main services and functions of the Radio Link Control (RLC) sublayer depend on the transmission mode and include:
- Transfer of upper layer Protocol Data Units (PDUs);
- Sequence numbering independent of the one in PDCP (Unacknowledged Mode (UM) and Acknowledged Mode (AM));
- Error Correction through Automatic Repeat-reQuest (ARQ) (AM only);
- Segmentation (AM and UM) and re-segmentation (AM only) of RLC SDUs;
- Reassembly of SDU (AM and UM);
- Duplicate Detection (AM only);
- RLC SDU discard (AM and UM);
- RLC re-establishment; and
- Protocol error detection (AM only).

The main services and functions of the Media Access Control (MAC) sublayer include:
- Mapping between logical channels and transport channels;
- Multiplexing/demultiplexing of MAC SDUs belonging to one or different logical channels into/from transport blocks (TB) delivered to/from the physical layer on transport channels;
- Scheduling information reporting;
- Error correction through HARQ (one HARQ entity per cell in case of Carrier Aggregation (CA));
- Priority handling between UEs by means of dynamic scheduling;
- Priority handling between logical channels of one UE by means of logical channel prioritisation;
- Priority handling between overlapping resources of one UE; and
- Padding.

Since there is no IP headers in the Non-IP packets, the UE-to-UE relay cannot use destination IP addresses to forward the packets. According to certain embodiments described herein, the UE-to-UE relay uses the Layer-2 IDs in the incoming Layer-2 frames to find the correct outgoing PC5 links. The solution may be based on the following principles:

1. For a specific source UE, the network device establishes a PC5 link for Non-IP traffic with the UE-to-UE relay for each target UE it wants to communicate via that relay. This means that the Non-IP traffic to different target UEs from the same source UE cannot share the same PC5 link between the source UE and the UE-to-UE relay;

2. For each pair of source and target UEs, the UE-to-UE relay assigns itself a Layer-2 ID, denoted as L2-ID_R, which is used in the Non-IP PC5 link to the source UE and the Non-IP PC5 link to the target UE. The UE-to-UE relay maintains a mapping between L2-ID_R and a pair of source and target UEs. When the source and target UEs send Non-IP traffic to each other via the UE-to-UE relay, they use L2-ID_R as the destination Layer-2 ID. When the UE-to-UE relay receives a packet, according to the L2-ID_R and the source L2-ID, the UE-to-UE relay can forward the packet to the correct PC5 link based on the mapping. The UE-to-UE relay also changes the destination L2-ID from L2-ID_R to the correct Layer2 ID of the destination UE.

Figure 3:
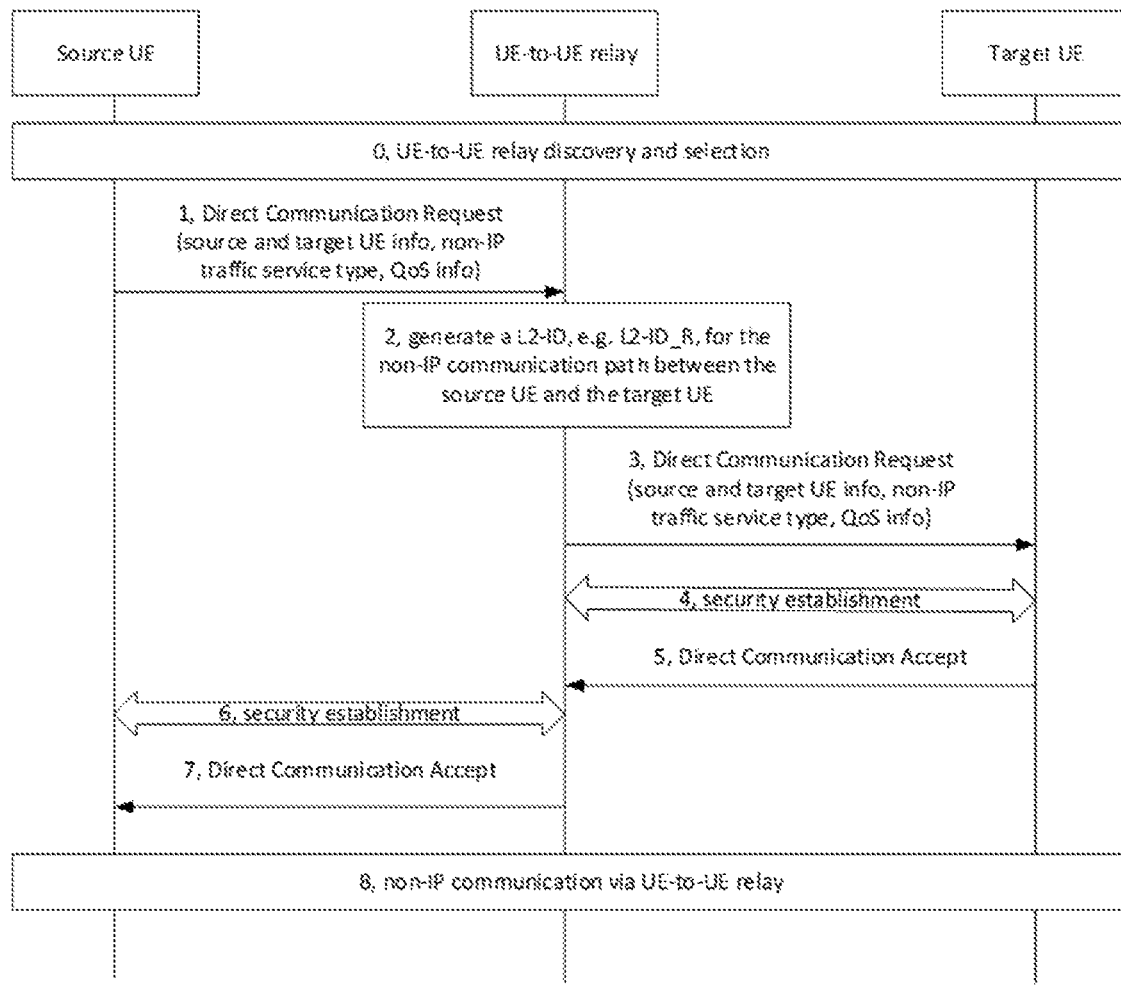
FIG. 3 illustrate a general process of Path establishment procedure for Non-IP traffic communication via a Layer-3 UE-to-UE relay according to the embodiments of the disclosure.

FIG. 3 illustrates an example path establishment procedure for Non-IP traffic communication via a Layer-3 UE-to-UE relay, according to certain embodiments. As depicted, the example path establishment procedure includes:

Step 0. Source UE and target UE do the relay selection. In this step, any solution for UE-to-UE relay selection can be applied.

Step 1. Source UE wants to start Non-IP communication with the target UE. The source UE starts to establish a PC5 unicast link with the relay by sending a Direct Communication Request to the relay as defined in clause 6.3.3.1 of 3GPP TS 23.287. In the request, the source UE indicates that the PC5 link is used for Non-IP communication to the target UE. The Direct Communication Request may include a source UE identifier for the source UE and a target UE identifier for a target UE.

Step 2. The UE-to-UE relay assigns itself a Layer-2 ID, denoted as L2-ID_R, which is used in the Non-IP PC5 link to the source UE and the Non-IP PC5 link to the target UE. Then, the UE-to-UE relay may maintain a mapping between the Layer2-ID_R, the source UE identifier, and the target UE identifier.

Step 3. The UE-to-UE relay sends a Direct Communication Request to the target UE, indicating that the link is used for Non-IP communication with the source UE. It also provides the L2-ID_R in the request.

Step 4. The target UE and the UE-to-UE relay setup security for the PC5 link. Note that L2-ID_R can be provided in either step 3 or step 4.

Step 5. The target UE sends Direct Communication Accept.

Step 6. The UE-to-UE relay and the source UE setup security for the PC5 link.

Step 7. The UE-to-UE relay sends Direct Communication Accept with L2-ID_R

Step 8. Non-IP communication between the source and the target UE via the relay. When the source and target UEs send Non-IP traffic to each other via the UE-to-UE relay, they use L2-ID_R as the destination L2-ID. When the UE-to-UE relay receives a packet, according to the L2-ID_R and the source L2-ID it can forward the packet to the correct PC5 link based on the mapping between the L2-ID_R and the pair of UEs, it also changes the destination L2-ID from L2-ID_R to the correct L2-ID of the destination UE.

The messages discussed herein are merely examples for the disclosure and should not limit the scope of the disclosure. It should be recognized that different types of messages may be used to implement the method(s) described herein without departing from the spirit and scope of the disclosure. Many different ways of executing the method are possible, as will be apparent to one of ordinary skill in the art. For example, the order of the steps can be varied or some steps may be executed in parallel. Moreover, additional method steps may be inserted between the steps described herein. The inserted steps may represent refinements of the method such as described herein, or may be unrelated to the method. For example, steps may be executed, at least partially, in parallel. A given step may not have finished completely before a next step is started. Moreover, fewer than all the illustrated steps may be required to implement an example methodology. Steps may be combined or separated into multiple sub-steps. Furthermore, additional or alternative methodologies can employ additional, not illustrated steps.

Figure 4:
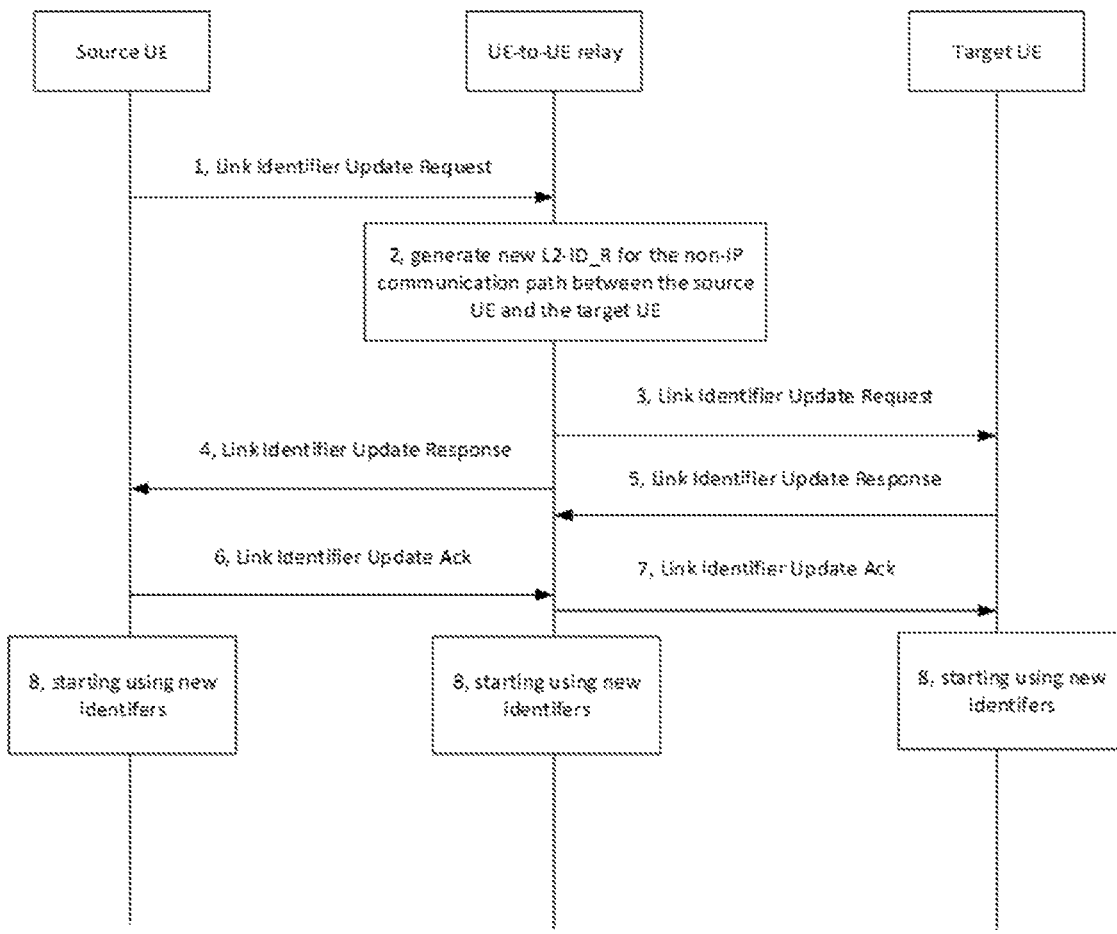
FIG. 4 illustrates a general process of Link identifier update procedure for Non-IP PC5 link with a Layer-3 UE-to-UE relay according to the embodiments of the disclosure.

FIG. 4 illustrates an example process of a Link identifier update procedure for Non-IP PC5 link with a Layer-3 UE-to-UE relay, according to certain embodiments. As depicted the method includes:

Step 1. The source UE decides to change its identifier(s), it sends Link Identifier Update Request with its new Layer2-ID to the UE-to-UE relay as defined in clause 6.3.3.2 TS 23.287. The source UE keeps sending data traffic to the UE-to-UE relay with the old identifiers until it sends the Link Identifier Update Ack to the relay.

Step 2. Upon receiving the Link Identifier Update Request message, the UE-to-UE relay assigns a new L2-ID_R for the link with the source UE and the link with the target UE.

Step 3. The UE-to-UE relay sends Link Identifier Update Request to the target UE with the new L2-ID_R. The UE-to-UE relay keeps sending data traffic to the target UE with the old identifiers until it sends the Link Identifier Update Ack to the target UE.

Step 4. The UE-to-UE relay sends Link Identifier Update Response to the source UE with the new L2-ID-R. The UE-to-UE relay continues to receive traffic with the old L2-ID_R from the source and target UE until it receives the traffic with new L2-ID_R from both the source and target UEs. After sending the Link Identifier Update response, the UE-to-UE relay keeps sending data traffic to the source UE with the old identifier until it receives the Link Identifier Update Ack message from the source UE. In a particular embodiment, Step 3 and Step 4 can happen in parallel.

Step 5. The Target UE sends Link Identifier Update Response with its new Layer-2 ID. The target UE continues to receive traffic with the old Layer-2 ID from UE-to-UE relay until the target UE receives traffic with the new Layer-2 ID from the relay. After sending the Link Identifier Update response, the target UE keeps sending data traffic to the relay with the old identifier until it receives the Link Identifier Update Ack message from the relay.

Step 6. The source UE sends the Link Identifier Update Ack to the UE-to-UE relay. The source UE continues to receive traffic with the old Layer-2 ID from the relay until the source UE receives traffic with the new Layer-2 ID from the relay.

After step 5 and step 6, the UE-to-UE relay maintains a mapping between the new L2-ID_R and the new identifiers of the source and target UEs. The UE-to-UE relay keeps the mapping between the old L2-ID_R and the old identifiers of the source and target UEs until the relay receives the traffic with the new identifiers from both the source and target UEs.

Step 7. The UE-to-UE relay sends Link Identifier Update Ack to the target UE.

Step 8. The source and target UEs start using their new identifiers and the UE-to-UE relay starts to use the new L2-ID_R.

Figure 5:
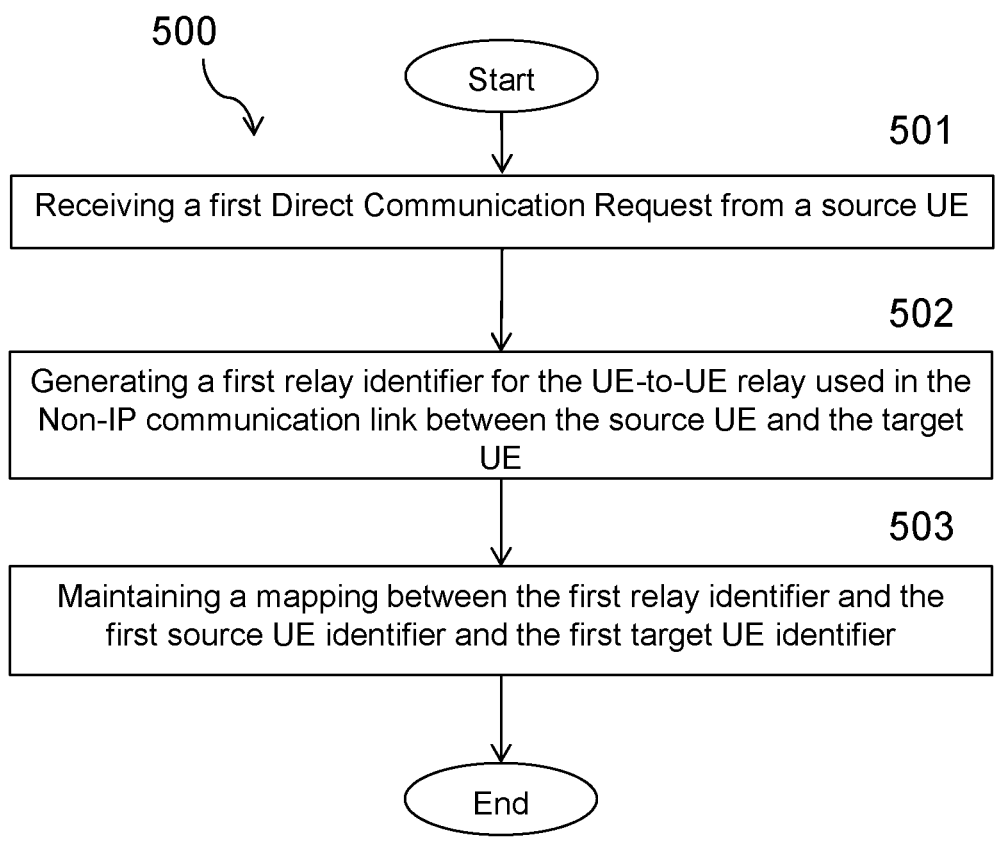
FIG. 5 illustrates a method for Non-IP traffic communication by a UE-to-UE relay, according to one or more embodiments of the present disclosure.

FIG. 5 illustrates an example flow diagram 500 for a method of Non-IP traffic communication by a UE-to-UE relay, according to certain embodiments.

At step 501, a first Direct Communication Request is received from a source UE. The first Direct Communication Request indicates the establishment of a Non-IP communication link with the source UE. The first Direct Communication Request may include a first source UE identifier for the source UE and a first target UE identifier for a target UE. At step 502, a first relay identifier may be generated for the UE-to-UE relay used in the Non-IP communication link between the source UE and the target UE. Then, at step 503, a mapping between the first relay identifier and the first source UE identifier and the first target UE identifier may be maintained.

In a particular embodiment, the method may include sending a first Direct Communication Accept to the source UE indicating that the Non-IP communication link has been established with the source UE.

In another particular embodiment, the method may include sending a second Direct Communication Request to the target UE. The second Direct Communication Request may indicate the establishment of the Non-IP communication link with the target UE. Thereafter, a second Direct Communication Accept may be received from the target UE. The second Direct Communication Accept may indicate that the Non-IP communication link has been established with the target UE.

As an example, the second Direct Communication Request includes the first relay identifier.

In another particular embodiment, the method may include establishing security with the target UE. The first relay identifier may be sent to the target UE during the security establishment with the target UE.

In another particular embodiment, the method may include establishing security with the source UE.

In yet another particular embodiment, the method may include receiving a Non-IP traffic packet from the source UE. The Non-IP packet may include the first relay identifier as a destination identifier. Then, the method may include forwarding the Non-IP traffic packet to the target UE based on the mapping between the first relay identifier and the first source UE identifier and the first target UE identifier.

In yet another particular embodiment, the method may include receiving a first Link Identifier Update Request from the source UE indicating that the source UE decides to change the source UE identifier. The first Link Identifier Update Request may include a second source UE identifier. Then, the method may include generating a second relay identifier for the Non-IP communication link between the source UE and the target UE.

In yet another particular embodiment, the method may include sending a first Link Identifier Update Response to the source UE with the second relay identifier. They method may also include receiving a first Link Identifier Update Ack from the source UE indicating that the source UE is to send traffic with the second source UE identifier.

In yet another particular embodiment, the method may include sending a second Link Identifier Update Request to the target UE. The second Link Identifier Update Request may include the second relay identifier. Then, the method may include receiving a second Link Identifier Update Response from the target UE. The second Link Identifier Update Response may include a second target UE identifier.

In yet another particular embodiment, the method may include sending a second Link Identifier Update Ack to the target UE indicating that the relay is to send traffic with the second relay identifier.

In yet another particular embodiment, the method may further include maintaining a mapping between the second relay identifier, the second source UE identifier, and the second target UE identifier.

Figure 6:
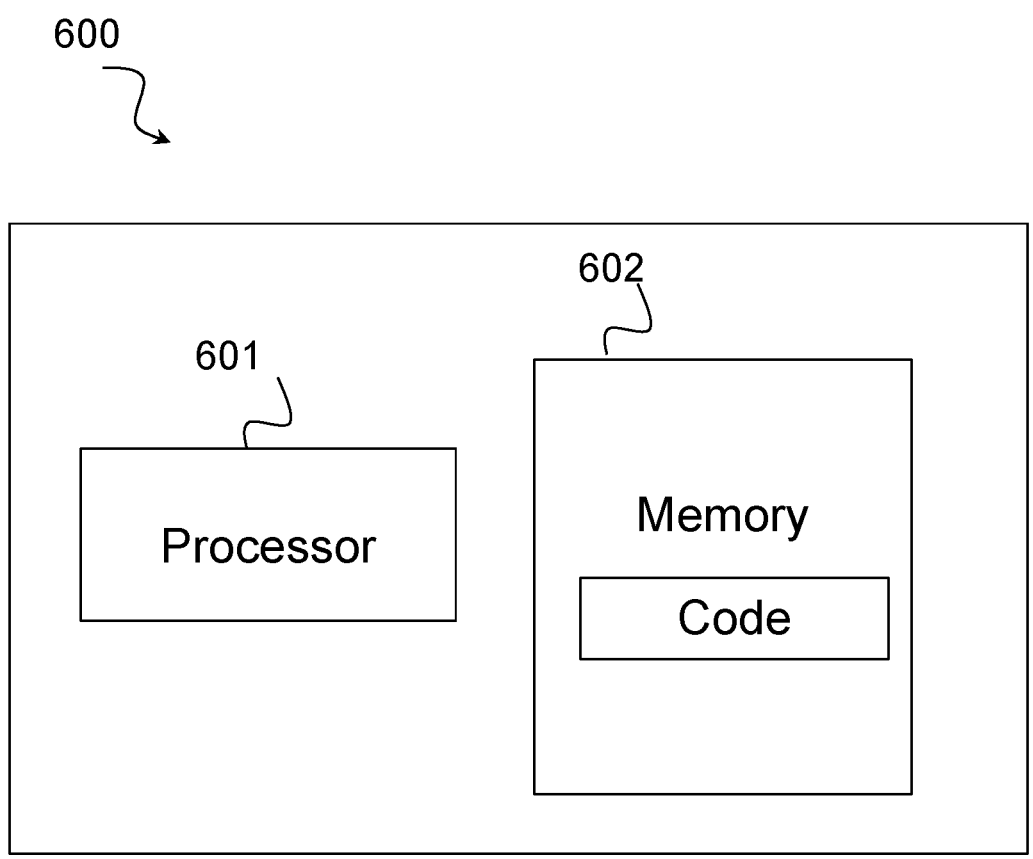
FIG. 6 illustrates a network device, according to certain embodiments.

FIG. 6 illustrates an example network device 600, according to certain embodiments. It should be appreciated that the depicted network device 600 is provided as an example. Network device 600 may be implemented using components other than those illustrated in FIG. 6.

With reference to FIG. 6, the network device 600 may include at least a processor 601, a memory 602, an interface and a communication medium. The processor 601, the memory 602 and the interface are communicatively coupled to each other via the communication medium.

The processor 601 includes one or more processing units. A processing unit may be a physical device or article of manufacture comprising one or more integrated circuits that read data and instructions from computer readable media, such as the memory 602, and selectively execute the instructions. In various embodiments, the processor 601 is implemented in various ways. As an example, the processor 602 may be implemented as one or more processing cores. As another example, the processor 601 may comprise one or more separate microprocessors. In yet another example, the processor 601 may comprise an application-specific integrated circuit (ASIC) that provides specific functionality. In yet another example, the processor 601 provides specific functionality by using an ASIC and by executing computer-executable instructions.

The memory 601 includes one or more computer-usable or computer-readable storage medium capable of storing data and/or computer-executable instructions. It should be appreciated that the storage medium is preferably a non-transitory storage medium.

The communication medium facilitates communication among the processor 601, the memory 602, and the interface. The communication medium may be implemented in various ways. For example, the communication medium may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium. The interface could be coupled to the processor. Information and data as described above in connection with the methods may be sent via the interface.

In the example of FIG. 6, the instructions stored in the memory 602 may include those that, when executed by the processor 601, cause the network device 600 to implement the methods described with respect to FIGS. 3 to 5.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method implemented by a network device operating as a relay in a communication network, the method comprising:

receiving a first Direct Communication Request from a source User Equipment, UE, the first Direct Communication request indicating the establishment of a Non-Internet Protocol, Non-IP, communication link with the source UE, the first Direct Communication Request including a first source UE identifier for the source UE and a first target UE identifier for a target UE;

generating a first relay identifier for the relay used in the Non-IP communication link between the source UE and the target UE;

maintaining a mapping between the first relay identifier, the first source UE identifier, and the first target UE identifier;

receiving a Non-IP traffic packet from the source UE, including the first relay identifier as a destination identifier; and forwarding the Non-IP traffic packet to the target UE based on the mapping between the first relay identifier and the first source UE identifier and the first target UE identifier, wherein the Non-IP traffic is not IP encapsulated.

2. The method of claim 1, further comprising:
sending a first Direct Communication Accept to the source UE indicating that the Non-IP communication link has been established with the source UE.

3. The method of claim 1, further comprising:
sending a second Direct Communication Request to the target UE indicating the establishment of the Non-IP communication link with the target UE; and
receiving a second Direct Communication Accept from the target UE indicating that the Non-IP communication link has been established with the target UE; and optionally,
wherein the second Direct Communication Request includes the first relay identifier.

4. The method of claim 1, further comprising:
establishing security with the target UE, the first relay identifier is sent to the target UE during the security establishment with the target UE; and optionally, further comprising: establishing security with the source UE.

5. The method of claim 1, further comprising:
receiving a first Link Identifier Update Request from the source UE indicating that the source UE has changed the source UE identifier, the first Link Identifier Update Request including a second source UE identifier;
generating a second relay identifier for the Non-IP communication link between the source UE and the target UE; and optionally,
further comprising: sending a first Link Identifier Update Response to the source UE with the second relay identifier; and optionally receiving a first Link Identifier Update Acknowledgment from the source UE indicating that the source UE has received the second source UE identifier.

6. The method of claim 5, further comprising:
sending a second Link Identifier Update Request to the target UE, the second Link Identifier Update Request including the second relay identifier; and
receiving a second Link Identifier Update Response from the target UE, the second Link Identifier Update Response including a second target UE identifier; and optionally,
further comprising:
sending a second Link Identifier Update Acknowledgment to the target UE indicating that the relay is to send traffic with the second relay identifier; and optionally, further comprising: maintaining a mapping between the second relay identifier, the second source UE identifier and the second target UE identifier.

7. A network device in a communication network, comprising:
a processor; and
a memory communicatively coupled to the processor and adapted to store instructions which, when executed by the processor, cause the network device to:
receive a first Direct Communication Request from a source User Equipment, UE, the first Direct Communication request indicating the establishment of a Non-Internet Protocol, Non-IP, communication link with the source UE, the first Direct Communication Request including a first source UE identifier for the source UE and a first target UE identifier for a target UE;
generate a first relay identifier for the relay used in the Non-IP communication link between the source UE and the target UE;
maintain a mapping between the first relay identifier, the first source UE identifier, and the first target UE identifier;
receive a Non-IP traffic packet from the source UE, including the first relay identifier as a destination identifier; and
forward the Non-IP traffic packet to the target UE based on the mapping between the first relay identifier and the first source UE identifier and the first target UE identifier, wherein the Non-IP traffic is not IP encapsulated.

8. The network device of claim 7, wherein the instructions, when executed by the processor, further cause the network device to:
sending a first Direct Communication Accept to the source UE indicating that the Non-IP communication link has been established with the source UE.

9. The network device of claim 7, wherein the instructions, when executed by the processor, further cause the network device to:
send a second Direct Communication Request to the target UE indicating the establishment of the Non-IP communication link with the target UE; and
receive a second Direct Communication Accept from the target UE indicating that the Non-IP communication link has been established with the target UE; and optionally,
wherein the second Direct Communication Request includes the first relay identifier.

10. The network device of claim 7, wherein the instructions, when executed by the processor, further cause the network device to:
establish security with the target UE, the first relay identifier is sent to the target UE during the security establishment with the target UE; and optionally, establish security with the source UE.

11. The network device of claim 7, wherein the instructions, when executed by the processor, further cause the network device to:
receive a first Link Identifier Update Request from the source UE indicating that the source UE has changed the source UE identifier, the first Link Identifier Update Request including a second source UE identifier;
generate a second relay identifier for the Non-IP communication link between the source UE and the target UE; and optionally,
send a first Link Identifier Update Response to the source UE with the second relay identifier; and optionally receiving a first Link Identifier Update Acknowledgment from the source UE indicating that the source UE has received the second source UE identifier.

12. The network device of claim 11, wherein the instructions, when executed by the processor, further cause the network device to:
send a second Link Identifier Update Request to the target UE, the second Link Identifier Update Request including the second relay identifier; and
receive a second Link Identifier Update Response from the target UE, the second Link Identifier Update Response including a second target UE identifier; and optionally,
send a second Link Identifier Update Acknowledgment to the target UE indicating that the relay is to send traffic with the second relay identifier; and optionally,
maintain a mapping between the second relay identifier, the second source UE identifier and the second target UE identifier.

13. A non-transitory machine-readable medium having a computer program stored thereon, which when executed by a set of one or more processors of a network device, causes the network device to:
receive a first Direct Communication Request from a source User Equipment, UE, the first Direct Communication request indicating the establishment of a Non-Internet Protocol, Non-IP, communication link with the source UE, the first Direct Communication Request including a first source UE identifier for the source UE and a first target UE identifier for a target UE;
generate a first relay identifier for the relay used in the Non-IP communication link between the source UE and the target UE;
maintain a mapping between the first relay identifier, the first source UE identifier, and the first target UE identifier;
receive a Non-IP traffic packet from the source UE, including the first relay identifier as a destination identifier; and
forward the Non-IP traffic packet to the target UE based on the mapping between the first relay identifier and the first source UE identifier and the first target UE identifier, wherein the Non-IP traffic is not IP encapsulated.

14. The non-transitory machine-readable medium of claim 13, wherein the computer program, when executed by the set of one or more processors, further causes the network device to:
sending a first Direct Communication Accept to the source UE indicating that the Non-IP communication link has been established with the source UE.

15. The non-transitory machine-readable medium of claim 13, wherein the computer program, when executed by the set of one or more processors, further causes the network device to:
send a second Direct Communication Request to the target UE indicating the establishment of the Non-IP communication link with the target UE; and
receive a second Direct Communication Accept from the target UE indicating that the Non-IP communication link has been established with the target UE; and optionally,
wherein the second Direct Communication Request includes the first relay identifier.

16. The non-transitory machine-readable medium of claim 13, wherein the computer program, when executed by the set of one or more processors, further causes the network device to:
establish security with the target UE, the first relay identifier is sent to the target UE during the security establishment with the target UE; and optionally, establish security with the source UE.

17. The non-transitory machine-readable medium of claim 13, wherein the computer program, when executed by the set of one or more processors, further causes the network device to:
receive a first Link Identifier Update Request from the source UE indicating that the source UE has changed the source UE identifier, the first Link Identifier Update Request including a second source UE identifier;
generate a second relay identifier for the Non-IP communication link between the source UE and the target UE; and optionally,
send a first Link Identifier Update Response to the source UE with the second relay identifier; and optionally receiving a first Link Identifier Update Acknowledgment from the source UE indicating that the source UE has received the second source UE identifier.

* * * * *